US007381394B2

(12) United States Patent
Tanaka et al.

(10) Patent No.: US 7,381,394 B2
(45) Date of Patent: Jun. 3, 2008

(54) METHOD FOR PRODUCING PEROVSKITE-TYPE COMPOSITE OXIDE

(75) Inventors: Hirohisa Tanaka, Shiga (JP); Kimiyoshi Kaneko, Kanagawa (JP)

(73) Assignees: Daihatsu Motor Co., Ltd., Osaka (JP); Hokko Chemical Industry Co. Ltd., Osaka (JP)

( * ) Notice: Subject to any disclaimer, the term of this patent is extended or adjusted under 35 U.S.C. 154(b) by 61 days.

(21) Appl. No.: 10/520,068

(22) PCT Filed: Jul. 3, 2003

(86) PCT No.: PCT/JP03/08438

§ 371 (c)(1),
(2), (4) Date: Jan. 5, 2005

(87) PCT Pub. No.: WO2004/005194

PCT Pub. Date: Jan. 15, 2004

(65) Prior Publication Data

US 2005/0249653 A1 Nov. 10, 2005

(30) Foreign Application Priority Data

Jul. 9, 2002 (JP) ............... 2002-200593

(51) Int. Cl.
*C01G 1/00* (2006.01)
(52) U.S. Cl. .............. 423/593.1; 423/594.1; 423/594.2; 423/594.3; 423/594.4; 423/594.5; 423/594.6; 423/595; 423/596; 423/598; 423/599; 423/600; 423/594.8; 423/594.12; 423/594.13; 423/594.14; 423/594.16; 423/263; 502/525
(58) Field of Classification Search ........... 423/593.1, 423/594.1, 594.2, 594.3, 594.4, 594.5, 594.6, 423/595, 596, 598, 599, 600, 594.8, 594.12, 423/594.13, 594.14, 594.16, 263; 502/525
See application file for complete search history.

(56) References Cited

U.S. PATENT DOCUMENTS

| 4,182,694 A | 1/1980 | Lauder et al. |
| 4,200,554 A | 4/1980 | Lauder et al. |
| 4,294,726 A | 10/1981 | Bozon et al. |
| 5,139,992 A | 8/1992 | Tauster et al. |
| 5,212,142 A | 5/1993 | Dettling |
| 5,254,519 A | 10/1993 | Wan et al. |
| 5,380,692 A | 1/1995 | Nakatsuji et al. |
| 5,439,865 A | 8/1995 | Abe et al. |
| 5,447,705 A | 9/1995 | Petit et al. |
| 5,462,907 A | 10/1995 | Farrauto et al. |
| 5,491,120 A | 2/1996 | Voss et al. |
| 5,622,680 A | 4/1997 | Monceaux et al. |
| 5,814,576 A | 9/1998 | Yamamoto |
| 5,837,642 A | 11/1998 | Tanaka et al. |
| 5,849,659 A | 12/1998 | Tanaka et al. |
| 5,990,038 A | 11/1999 | Suga et al. |
| 6,033,632 A | 3/2000 | Schwartz et al. |
| 6,261,989 B1 | 7/2001 | Tanaka et al. |
| 6,352,955 B1 | 3/2002 | Golden |
| 6,464,946 B1 | 10/2002 | Yamada et al. |
| 6,531,425 B2 * | 3/2003 | Golden ............ 502/302 |
| 6,534,031 B2 * | 3/2003 | Bedard ............ 423/593.1 |
| 6,569,803 B2 | 5/2003 | Takeuchi |
| 6,576,200 B1 | 6/2003 | Yamamoto et al. |
| 6,602,479 B2 | 8/2003 | Taniguchi et al. |
| 6,620,762 B2 | 9/2003 | Tan et al. |
| 6,682,706 B1 | 1/2004 | Yamamoto et al. |
| 6,800,388 B2 | 10/2004 | Kaneko et al. |
| 6,808,687 B1 | 10/2004 | Uenishi et al. |
| 6,864,214 B2 | 3/2005 | Uenishi et al. |
| 6,881,384 B1 | 4/2005 | Uenishi et al. |
| 2001/0053467 A1 | 12/2001 | Kaneko et al. |

FOREIGN PATENT DOCUMENTS

| EP | 0525677 | 2/1993 |
| EP | 1 035 074 A | 9/2000 |
| FR | 2 665 089 | 1/1992 |
| JP | 51-91890 | 8/1976 |
| JP | 60-025544 | 2/1985 |
| JP | 61-191518 | 8/1986 |
| JP | 61-232217 | 10/1986 |
| JP | S62-106845 | 5/1987 |
| JP | 62-241552 | 10/1987 |
| JP | S62-262745 | 11/1987 |

(Continued)

OTHER PUBLICATIONS

Hirohisa Tanaka et al., "An Intelligent Catalyst", Society of Automotive Engineers, 01-2001-1301.
Nolven Guilhaume et al., "Three-Way Catalytic Activity and Oxygen Storage Capacity of Perovskite . . . " 1997, p. 197-204, vol. 165, article No. CA971481.
Nobuhiko Kajita et al., "Regeneration of Precious Metals in Various Designed Intelligent Perovskite Catalysts", Society of Automotive Engineers, 2002-01-0735.

(Continued)

*Primary Examiner*—Timothy C. Vanoy
(74) *Attorney, Agent, or Firm*—Jean C. Edwards, Esq.; Akerman Senterfitt

(57) ABSTRACT

Methods of producing a safe and hygienic method for industrially and efficiently producing a perovskite-type composite oxide are provided that can maintain the catalytic activity of a noble metal at a high level. Methods include preparing a precursor of the perovskite-type composite oxide by mixing organometal salts of elementary components of the perovskite-type composite oxide and heat treating the precursor. The precursor may be prepared by mixing all elementary components constituting the perovskite-type composite oxide, or by mixing one or more organometal salts of part of the elementary components with the other elementary components prepared as alkoxides, a coprecipitate of salts, or a citrate complex of the respective elements.

6 Claims, No Drawings

FOREIGN PATENT DOCUMENTS

| | | |
|---|---|---|
| JP | 63-302950 | 12/1988 |
| JP | H01-011643 | 1/1989 |
| JP | H02-265648 | 10/1990 |
| JP | 03-068451 | 3/1991 |
| JP | H03-186346 | 8/1991 |
| JP | 05-31367 | 2/1993 |
| JP | H05-076762 | 3/1993 |
| JP | H05-220395 | 8/1993 |
| JP | H05-245372 | 9/1993 |
| JP | H05-253484 | 10/1993 |
| JP | H05-509033 | 12/1993 |
| JP | 06-100319 | 4/1994 |
| JP | H06-210175 | 8/1994 |
| JP | H06-304449 | 11/1994 |
| JP | 07-68175 | 3/1995 |
| JP | 07-080311 | 3/1995 |
| JP | H07-116519 | 5/1995 |
| JP | H07-299360 | 11/1995 |
| JP | H07-308578 | 11/1995 |
| JP | 08-217461 | 8/1996 |
| JP | H08-217461 | 8/1996 |
| JP | H08-224446 | 9/1996 |
| JP | H10-277389 | 10/1998 |
| JP | H11-057471 | 3/1999 |
| JP | H11-207183 | 8/1999 |
| JP | H11-262663 | 9/1999 |
| JP | 2000-15097 | 1/2000 |
| JP | 2000-42368 | 2/2000 |
| JP | 2000-143251 | 5/2000 |
| JP | 2000-256017 | 9/2000 |
| JP | 2001-224963 | 8/2001 |
| WO | WO 2004/004899 | 1/2004 |

OTHER PUBLICATIONS

Hirohisa Tanaka et al., "Regeneration of Palladium . . . ", Topics in Catalysis, vols. 16/17, Nos. 1-4, 2001.

T. Motohiro et al., "Time-resolved Time-of-flight Mass Spectrometry . . . " (I), Applied Surface Science 121/122 (1997) 319-322.

T. Motohiro et al., "Time-resolved Time-of-flight Mass Spectrometry . . . " (II), Applied Surface Science 121/122 (1997) 323-326.

Hirohisa Tanaka et al. "Perovskite Shokubai eno Kikinzou Tanji Koka" Shokubai Toronkai Toronkai A Yokoshu, vol. 88, 2001, p. 112.

Iseki Yoshikazu et al., "Analysis of Solid Solution Formation and Precipitation Phenomena of Pd in Pd Perovskite Catalyst", Catalysts & Catalysts, 2002, vol. 44, No. 2 2002.

Catalysis Society of Japan, Tokyo-to, Japan.

\* cited by examiner

METHOD FOR PRODUCING PEROVSKITE-TYPE COMPOSITE OXIDE

TECHNICAL FIELD

The present invention relates to a method for producing a perovskite-type composite oxide. More specifically, it relates to a perovskite-type composite oxide which is advantageously used as an exhaust gas purifying catalyst for efficiently purifying carbon monoxide (CO), hydrocarbons (HC), and nitrogen oxides (NOx).

BACKGROUND ART

Noble metals such as Pt (platinum), Rh (rhodium) and Pd (palladium) supported by perovskite-type composite oxides represented by the general formula: $ABO_3$ have been widely known as three-way catalysts which can simultaneously clean up carbon monoxide (CO), hydrocarbons (HC), and nitrogen oxides (NOx) contained in emissions.

When such a noble metal is merely supported by the perovskite-type composite oxide, however, the noble metal undergoes grain growth at the surface of the perovskite-type composite oxide in use at high temperatures. To avoid this, techniques of incorporating a noble metal into a perovskite-type composite oxide as its constitutional element have been proposed.

Japanese Laid-open (Unexamined) Patent Publication No. Hei 6-100319, for example, discloses a method of producing a perovskite-type composite oxide. In this method, an aqueous solution containing citric acid and salts of elements constituting the perovskite-type composite oxide and including the noble metals is initially prepared, and the aqueous solution is dried to obtain a complex between citric acid and the respective elements. The complex is thermally decomposed by heating at 350° C. or higher in vacuum or in an atmosphere of inert gas to obtain a precursor. The precursor is subjected to a heat treatment under an oxidative atmosphere to obtain the perovskite-type composite oxide.

Japanese Laid-open (Unexamined) Patent Publication No. Hei 8-217461 discloses a method for producing a perovskite-type composite oxide. In this method, a solution of alkoxides of elements constituting the perovskite-type composite oxide other than the noble metal is initially prepared. The alkoxide solution is hydrolyzed by adding an aqueous solution of a salt of the noble metal, and the solvent and fluid are removed to obtain a precursor. The resulting precursor is subjected to a heat treatment at 500° C. to 500° C. under an oxidative atmosphere to obtain the perovskite-type composite oxide.

Japanese Laid-open (Unexamined) Patent Publication No. 2000-15097 discloses a method for producing a perovskite-type composite oxide. In this method, a salt of the noble metal constituting the perovskite-type composite oxide is mixed with an organic polymer to obtain a colloid solution of the noble metal. The colloid solution is mixed with alkoxides of elements constituting the perovskite-type composite oxide and is then hydrolyzed to obtain a precursor. The precursor is dried and is subjected to a heat treatment to obtain the perovskite-type composite oxide.

In these perovskite-type composite oxides, the noble metals can be finely and highly dispersed therein and can maintain their high catalytic activities even in long-term use. This is because of a self-regenerative function, in which the noble metals undergo repetitive solid-solution under an oxidative atmosphere and deposition under a reducing atmosphere. These findings have been obtained in recent years.

Any of the above-mentioned methods, however, has limitations to efficiently disperse the noble metal in the perovskite-type composite oxide for a higher rate of solid-solution and to improve the catalytic activity.

The above-mentioned methods use the noble metal as an aqueous solution of a salt thereof such as nitrate, chloride, or dinitrodiammine salt and may invite an abrupt exothermic reaction in the heat treatment, which may in turn invite bubbling over of the resulting powder. To avoid this, the temperature must be gradually raised, which constitutes a significant limitation in industrial production. In addition, the heat treatment yields harmful by-products such as nitric acid, hydrochloric acid, or amines but these must be avoided for safety or hygiene.

In addition, the above-mentioned methods require considerably high temperatures in the heat treatment to form a single phase of the perovskite-type composite oxide. The heat treatment at such high temperatures, however, inevitably invites a decreased specific surface area.

DISCLOSURE OF INVENTION

Accordingly, an object of the present invention is to provide a highly safe and hygienic method for industrially efficiently producing a perovskite-type composite oxide at low temperatures in a heat treatment, in which the resulting perovskite-type composite oxide can maintain the catalytic activity of a noble metal at a high level over a long time.

The present invention therefore provides a method for producing a perovskite-type composite oxide, which comprises the steps of preparing a precursor of the provskite-type composite oxide by mixing at least organometal salts of elementary components constituting the perovskite-type composite oxide, and heat-treating the precursor of the perovskite-type composite oxide.

In the preparation step, the precursor of the perovskite-type composite oxide can be prepared by mixing one or more organometal salts of part of the elementary components constituting the perovskite-type composite oxide with the other elementary components.

The other elementary components can be prepared as alkoxides of the respective elements.

The other elementary components can also be prepared as a coprecipitate of salts of the respective elements or a citrate complex of the respective elements.

The part of the elementary components is preferably one or more noble metals.

The organometal salts of the elementary components are preferably organic carboxylic acid salts of the elementary components and/or a metal complex of the elementary components including at least one selected from the group consisting of β-diketone compounds, β-ketoester compounds, and β-dicarboxylic ester compounds.

The perovskite-type composite oxide in the present invention is preferably a perovskite-type composite oxide represented by the following general formula (1):

$$ABMO_3 \tag{1}$$

wherein A represents at least one element selected from rare-earth elements, alkaline earth metals, and Ag; B represents at least one element selected from Al and transition metals excluding platinum group elements and rare-earth elements; and M represents one or more platinum group elements.

The method for producing a perovskite-type composite oxide of the present invention is free from an abrupt exothermic reaction in the heat treatment, is thereby substantially free from the bubbling over of the resulting powder and can industrially efficiently carry out the heat treatment. In addition, the heat treatment yields organic substances from decomposed organometal salts but does not yield harmful by-products, thus improving the safety and hygiene.

Further, the method for producing a perovskite-type composite oxide of the present invention can yield a perovskite-type composite oxide of a single phase even at relatively low temperatures and can thereby prevent the specific surface area of the resulting perovskite-type composite oxide from decreasing.

The perovskite-type composite oxide produced by the method for producing a perovskite-type composite oxide of the present invention allows the noble metal to be efficiently dispersed therein thereby to increase a rate of solid-solution. In the perovskite-type composite oxide, the noble metal is finely and highly dispersed and can maintain its high catalytic activity even in long-term use. This is because of the self-regenerative function in which the noble metal repetitively undergoes solid-solution under an oxidative atmosphere and deposition under a reducing atmosphere.

BEST MODE FOR CARRYING OUT THE INVENTION

The method for producing a perovskite-type composite oxide of the present invention can be used in, but not specifically limited to, the production of a perovskite-type composite oxide represented by the following general formula (1):

$$ABMO_3 \tag{1}$$

wherein A represents at least one element selected from rare-earth elements, alkaline earth metals, and Ag; B represents at least one element selected from Al and transition metals excluding platinum group elements and the rare-earth elements; and M represents one or more platinum group elements.

More specifically, this composite oxide has a perovskite structure and comprises at least one element selected from rare-earth elements, alkaline earth metals, and Ag on the A site, and one or more platinum group elements and at least one element selected from Al and transition metals excluding platinum group elements and rare-earth elements on the B site.

Examples of the rare-earth elements represented by A include rare-earth elements each having a valence of 3 as the only valence, such as Sc (scandium), Y (yttrium), La (lanthanum), Nd (neodymium), Pm (promethium), Gd (gadolinium), Dy (dysprosium), Ho (holmium), Er (erbium), and Lu (lutetium); rare-earth elements each having a variable valence of 3 or 4, such as Ce (cerium), Tb (terbium), and Pr (praseodymium); and rare-earth elements each having a variable valence of 2 or 3, such as Eu (europium), Tm (thulium), Yb (ytterbium), and Sm (samarium).

These rare-earth elements can be used alone or in combination. The rare-earth element having a valence of 3 as the only valence is preferably used, optionally in combination with the rare-earth element having a variable valence of 3 or 4. More preferably, La, Nd, and/or Y is used optionally in combination with Ce and/or Pr.

Examples of the alkaline earth metals represented by A include Be (beryllium), Mg (magnesium), Ca (calcium), Sr (strontium), Ba (barium), and Ra (radium). These alkaline earth metals can be used alone or in combination. Among them, Mg, Ca, Sr, and Ba are preferred.

The at least one element selected from the rare-earth elements, the alkaline earth metals, and Ag to be contained on the A site is not specifically limited. Preferably, at least one element selected from La, Nd, and Y is essentially contained and at least one element selected from Ce, Pr, Mg, Ca, Sr, Ba, and Ag is optionally contained on the A site. In this case, the atomic ratio x of at least one element selected from Ce, Pr, Mg, Ca, Sr, Ba, and Ag preferably satisfies the following relation: $0 \leq x \leq 0.5$. Namely, the atomic ratio (1−x) of at least one element selected from La, Nd, and Y preferably satisfies the following relation: $0.5 \leq (1-x) \leq 1.0$.

The transition metals represented by B excluding the platinum group elements and the rare-earth elements are not specifically limited and include elements having atomic numbers of 22 (Ti) through 30 (Zn), atomic numbers of 40 (Zr) through 48 (Cd), and atomic numbers of 72 (Hf) through 80 (Hg) in the Periodic Table of Elements (IUPAC, 1990), except for Pd and Co. Specific examples thereof include, but are not limited to, Cr (chromium), Mn (manganese), Fe (iron), Co (cobalt), Ni (nickel), and Cu (copper). These transition elements can be used alone or in combination.

Examples of the platinum group elements represented by M include Ru (ruthenium), Rh (rhodium), Pd (palladium), Os (osmium), Ir (iridium), and Pt (platinum). These platinum group elements can be used alone or in combination. Among them, Ru, Rh, Pd, Ir, and Pt are preferred.

On the B site, at least one element selected from the platinum group elements and at least one element selected from Al and transition metals excluding the platinum group elements and the rare-earth elements are essentially contained. The atomic ratio y of the platinum group elements on the B site preferably satisfies the following relation: $0 < y \leq 0.5$. Namely, the atomic ratio (1−y) of Al and the transition metals excluding the platinum group elements and the rare-earth elements preferably satisfies the following relation: $0.5 \leq (1-y) < 1.0$.

As is described above, the method for producing a perovskite-type composite oxide of the present invention is more preferably used for the production of a perovskite-type composite oxide represented by the following general formula (2):

$$A_{1-x}A'_xB_{1-y}B'_yO_3 \tag{2}$$

wherein A represents at least one element selected from Y, La, and Nd; A' represents at least one element selected from Ce, Pr, Mg, Ca, Sr, Ba, and Ag; B represents at least one element selected from Cr, Mn, Fe, Co, Ni, Cu, and Al; B' represents at least one element selected from Ru, Rh, Pd, Ir, and Pt; x represents an atomic ratio satisfying the following relation: $0 \leq x \leq 0.5$; and y represents an atomic ratio satisfying the following relation: $0 < y \leq 0.5$.

According to the method for producing a perovskite-type composite oxide of the present invention, at least organometal salts of elementary components constituting the perovskite-type composite oxide are mixed to prepare a precursor of the perovskite-type composite oxide in the preparation step.

In this preparation step, the precursor may be prepared by mixing organometal salts of all the elementary components constituting the perovskite-type composite oxide or by mixing one or more organometal salts of part of the elementary components constituting the perovskite-type composite oxide with the other elementary components.

Examples of the organometal salts of the elementary components constituting the perovskite-type composite oxide include carboxylic acid salts of the elementary components derived from, for example, acetates or propionates; and metal chelate complexes of the elementary components derived from, for example, β-diketone compounds or β-ketoester compounds represented by the following general formula (3) and/or β-dicarboxylic ester compounds represented by the following general formula (4):

$$R^1COCHR^3COR^2 \quad (3)$$

wherein $R^1$ represents an alkyl group having 1 to 6 carbon atoms, a fluoroalkyl group having 1 to 6 carbon atoms or an aryl group; $R^2$ represents an alkyl group having 1 to 6 carbon atoms, a fluoroalkyl group having 1 to 6 carbon atoms, an aryl group or an alkyloxy group having 1 to 4 carbon atoms; and $R^3$ represents a hydrogen atom or an alkyl group having 1 to 4 carbon atoms, $$R^5CH(COOR^4)_2 \quad (4)$$

wherein $R^4$ represents an alkyl group having 1 to 6 carbon atoms; and $R^5$ represents a hydrogen atom or an alkyl group having 1 to 4 carbon atoms.

In above-mentioned general formulas (3) and (4), examples of the alkyl groups each having 1 to 6 carbon atoms as $R^1$, $R^2$, and $R^4$ include methyl, ethyl, propyl, isopropyl, n-butyl, s-butyl, t-butyl, t-amyl, and t-hexyl. Examples of the alkyl groups each having 1 to 4 carbon atoms as $R^3$ and $R^5$ include methyl, ethyl, propyl, isopropyl, n-butyl, s-butyl, and t-butyl. The fluoroalkyl groups each having 1 to 6 carbon atoms as $R^1$ and $R^2$ include, for example, trifluoromethyl. The aryl groups as $R^1$ and $R^2$ include, for example, phenyl. Examples of the alkyloxy group having 1 to 4 carbon atoms as $R^2$ include methoxy, ethoxy, propoxy, isopropoxy, n-butoxy, s-butoxy, and t-butoxy.

More specific examples of the β-diketone compounds include 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione, and dipivaloylmethane. Examples of the β-ketoester compounds include methyl acetoacetate, ethyl acetoacetate, and t-butyl acetoacetate. Examples of the β-dicarboxylic ester compounds include dimethyl malonate and diethyl malonate.

The organometal salts of the elementary components can be prepared as an organometal salt solution by mixing organometal salts of the respective elements of the elementary components. The organometal salt solution containing the organometal salts of the respective elements of the elementary components can be prepared, for example, by adding the organometal salts of the respective elements of the elementary components to an organic solvent so as to establish a predetermined stoichiometric ratio in the perovskite-type composite oxide and mixing them with stirring. The organic solvent is not specifically limited, as long as it can dissolve the organometal salts of the respective elements of the elementary components, and includes, for example, aromatic hydrocarbons, aliphatic hydrocarbons, alcohols, ketones and esters. Among them, a ketone such as acetone and/or an aromatic hydrocarbon such as benzene, toluene, or xylene is preferably used.

When all elementary components constituting the perovskite-type composite oxide are prepared as the organometal salt solution, the precursor of the perovskite-type composite oxide can be prepared, for example, by distilling off the solvent and thermally decomposing the organometal salts of the respective elements of the elementary components by gradually heating the residue to about 400° C.

When the precursor is prepared by mixing one or more organometal salts of part of the elementary components constituting the perovskite-type composite oxide with the other elementary components, the precursor can be prepared by preparing an organometal salt solution of the organometal salts of the part of the elementary components in the above-mentioned manner, separately preparing, for example, alkoxides of the respective elements of the other elementary components, a coprecipitate of salts of the respective elements, or a citrate complex of the respective elements, and mixing the former with the latter.

The part of the elementary components used as organometal salts is freely selected from among the respective elements constituting the perovskite-type composite oxide, of which preferred examples are the platinum group elements such as Ru, Rh, Pd, Os, Ir, and Pt and the noble metals such as Ag. These elementary components used as organometal salts can be used alone or in combination.

The organometal salt solution containing the part of the elementary components can be prepared, for example, by adding the organometal salts of the respective elements of the elementary components to an organic solvent so as to establish a predetermined stoichiometric ratio in the perovskite-type composite oxide and stirring the resulting mixture, as is described above. Any of the above-mentioned organic solvents may be used as the organic solvent herein.

The other elementary components are not specifically limited and are the remainder of the part of the respective elements constituting the perovskite-type composite oxide used as the organometal salts. They can be prepared as, but not limited to, alkoxides of the respective elements of the other elementary components, a coprecipitate of salts of the respective elements, or a citrate complex of the respective elements, as described above.

Examples of the alkoxides of the other elementary components include alcholates derived from the respective elements of the other elementary components and alkoxy such as methoxy, ethoxy, propoxy, isopropoxy, and butoxy; and alkoxyalcholates of the respective elements represented by the following general formula (5):

$$E[OCH(R^5)-(CH_2)_a-OR^6]s \quad (5)$$

wherein E represents the respective element; $R^5$ represents a hydrogen atom or an alkyl group having 1 to 4 carbon atoms; $R^6$ represents an alkyl group having 1 to 4 carbon atoms; a is an integer of 1 to 3; and s is an integer of 2 or 3.

More specific examples of the alkoxyalcholates are methoxyethylate, methoxypropylate, methoxybutylate, ethoxyethylate, ethoxypropylate, propoxyethylate, and butoxyethylate.

The alkoxides of the other elementary components can be prepared, for example, as a alkoxide mixed solution by adding the alkoxides of the respective elements of the other elementary components to an organic solvent so as to establish a predetermined stoichiometric ratio in the perovskite-type composite oxide and mixing them with stirring. Any of the above-listed organic solvents can be used as the organic solvent herein.

When the other elementary components are prepared as such an alkoxide mixed solution, the precursor of the perovskite-type composite oxide can be prepared by mixing the organometal salt solution of the part of the elementary components with the alkoxide mixed solution to prepare a homogenous mixed solution, coprecipitating the homogenous mixed solution upon hydrolysis by adding water thereto, and drying the resulting precipitate typically by vacuum drying or forced-air drying.

The coprecipitate of the other elementary components can be prepared, for example, by preparing an aqueous mixed salt solution containing salts of the respective elements of the other elementary components in a predetermined stoichiometric ratio in the perovskite-type composite oxide and allowing the aqueous mixed salt solution to coprecipitate by adding a neutralizing agent thereto.

Examples of the salts of the respective elements include inorganic salts such as sulfates, nitrates, chlorides, and phosphates; and salts of organic acids, such as acetates and oxalates, of which nitrates and/or acetates are preferred. The aqueous mixed salt solution can be prepared, for example, by adding salts of the respective elements of the other elementary components to water in such proportions as to establish a predetermined stoichiometric ratio in the perovskite-type composite oxide and mixing them with stirring.

Then, the aqueous mixed salt solution is coprecipitated by adding the neutralizing agent thereto. The neutralizing agent includes, but is not specifically limited to, ammonia; organic bases such as triethylamine and pyridine; and inorganic bases such as sodium hydroxide, potassium hydroxide, potassium carbonate, and ammonium carbonate. The neutralizing agent is added dropwise to the aqueous mixed salt solution so that the solution after the addition of the neutralizing agent has a pH of about 6 to 10. This dropwise addition efficiently coprecipitates the salts of the elements.

When the other elementary components are formed into such a coprecipitate, the resulting coprecipitate is separated typically by filtration or centrifugation and is fully washed with water to remove by-produced salts. The coprecipitate from which salts have been removed is dried and, where necessary, mixed with water to obtain a paste slurry, is mixed with the organometal salt solution of the part of elementary components with stirring to obtain a homogenous slurry. The slurry is then evaporated to dryness as intact or after filtration if necessary. The precursor of the perovskite-type composite oxide is thus prepared.

The citrate complex of the other elementary components can be prepared, for example, as an aqueous citrate mixed salt solution containing citric acid and salts of the respective elements of the other elementary components in such proportions so as to establish a predetermined stoichiometric ratio in the perovskite-type composite oxide.

The salts of the respective elements of the other elementary components may be the same as those listed above, of which acetates and/or nitrates are preferably used. The aqueous citrate mixed salt solution can be prepared, for example, by preparing the aqueous mixed salt solution by the above-mentioned procedure and mixing the resulting aqueous mixed salt solution with an aqueous solution of citric acid. The amount of citric acid is, for example, preferably about 2 to 3 moles per 1 mole of the perovskite-type composite oxide.

When the other elementary components are formed into such an aqueous citrate mixed salt solution, the organometal salt solution of the part of the elementary components is added to the aqueous citrate mixed salt solution and is mixed with stirring to obtain a homogenous slurry, fluid of the slurry is evaporated to dryness by heating under reduced pressure to obtain a mixture of organometal salts of the part of the elementary components and the citrate complex of the other elementary components. The organometal salts of the part of the elementary components and the citrate complex of the other elementary components are then thermally decomposed by heating the mixture gradually to about 400° C. This yields the precursor of the perovskite-type composite oxide.

When the other elementary components are formed into the aqueous citrate mixed salt solution, the precursor of the perovskite-type composite oxide can also be prepared in the following manner. The water in the aqueous citrate mixed salt solution is evaporated to dryness by heating under reduced pressure to obtain a citrate complex of the other elementary components, and the citrate complex is thermally decomposed to obtain a decomposed product. The organometal salt solution of the part of the elementary components is added to and they are mixed with stirring to obtain a homogeneous slurry, and the solvent in the homogeneous slurry is evaporated to dryness.

According to the method for producing a perovskite-type composite oxide of the present invention, the above-prepared precursor of the perovskite-type composite oxide is heat-treated in the heat treatment step to obtain the perovskite-type composite oxide.

The heat treatment is not specifically limited and may be carried out, for example, by baking the precursor of the perovskite-type composite oxide at 500° C. to 1000° C. and preferably at 500° C. to 850° C. under an oxidative atmosphere.

When the perovskite-type composite oxide is produced in the above-mentioned manner, the heat treatment is free from an abrupt exothermic reaction, is substantially free from bubbling over of the resulting powder and can be industrially efficiently carried out.

The heat treatment by-produces organic substances from the decomposed organometal salts but does not by-produce harmful by-products. Thus, the safety and hygiene can be improved.

In addition, by producing the perovskite-type composite oxide in the above-mentioned manner, the perovskite-type composite oxide of a single phase can be formed even at relatively low temperatures. This prevents the specific surface area of the resulting perovskite-type composite oxide from decreasing.

The perovskite-type composite oxide prepared according to the method can comprise the noble metal efficiently dispersed therein and can have an increased rate of solid-solution. In the perovskite-type composite oxide produced by the method, the noble metal is finely and highly dispersed thereby to maintain its high catalytic activity even in long-term use. This is because of the self-regenerative function in which the noble metal repetitively undergoes solid-solution under an oxidative atmosphere and deposition under a reducing atmosphere.

Thus, the perovskite-type composite oxide produced by the method can maintain the catalytic activity of the noble metal at a high level over a long time and can be advantageously used as an exhaust gas purifying catalyst, particularly as an exhaust gas purifying catalyst for automobiles.

When the perovskite-type composite oxide produced by the method is used as an exhaust gas purifying catalyst, the produced perovskite-type composite oxide may be used intact or may be processed into an exhaust gas purifying catalyst according to a conventional procedure such as supporting on a catalyst carrier.

The catalyst carrier can be any of known catalyst carriers such as honeycomb monolith carriers derived from cordierite, without being limited to a particular catalyst carrier.

The produced perovskite-type composite oxide is supported by the catalyst carrier, for example, by adding water thereto to obtain a slurry, applying the slurry to the catalyst carrier, drying the applied slurry and subjecting the same to heat treatment at about 300° C. to 800° C., and preferably at about 300° C. to 600° C.

EXAMPLES

The present invention will be illustrated in further detail with reference to several examples and comparative examples below, which are never intended to limit the scope of the present invention.

Example 1

Initially, an alkoxide mixed solution was prepared by charging 36.6 g (0.090 mol) of lanthanum methoxypropylate [La(OCHMeCH$_2$OMe)$_3$], 4.1 g (0.010 mol) of cerium methoxypropylate [Ce(OCHMeCH$_2$OMe)$_3$], 18.4 g (0.057 mol) of iron methoxypropylate [Fe(OCHMeCH$_2$OMe)$_3$], and 9.0 g (0.038 mol) of cobalt methoxypropylate [Co(OCHMeCH$_2$OMe)$_2$] in a 1000-mL round-bottomed flask and dissolving them in 200 mL of toluene added thereto with stirring.

Separately, 1.52 g (0.005 mol) of palladium acetylacetonate [Pd(CH$_3$COCHCOCH$_3$)$_2$] was dissolved in 200 mL of toluene to obtain an organometal salt solution, and the organometal salt solution was further added to the alkoxide mixed solution in the round-bottomed flask to obtain a homogenous mixed solution containing LaCeFeCoPd.

Next, 200 mL of deionized water was added dropwise to the round-bottomed flask over about fifteen minutes to form a viscous brown precipitate on hydrolysis.

After stirring at room temperature for two hours, toluene and water were distilled off under reduced pressure to obtain a precursor of the LaCeFeCoPd composite oxide. The precursor was placed on a petri dish, subjected to forced-air drying at 60° C. for twenty-four hours, subjected to heat treatment at 600° C. in the atmosphere for two hours using an electric furnace to obtain a blackish brown powder.

The X-ray powder diffraction analysis of the powder revealed that it was identified as a single crystal phase comprising a composite oxide having a perovskite structure of $La_{0.90}Ce_{0.10}Fe_{0.57}Co_{0.38}Pd_{0.05}O_3$. The powder was found to have a specific surface area of 36 m$^2$/g and a Pd content in the composite oxide of 2.16% by mass.

Example 2

Initially, an alkoxide mixed solution was prepared by charging 40.6 g (0.100 mol) of lanthanum methoxypropylate [La(OCHMeCH$_2$OMe)$_3$], 18.4 g (0.057 mol) of iron methoxypropylate [Fe(OCHMeCH$_2$OMe)$_3$], and 8.9 g (0.038 mol) of manganese methoxypropylate [Mn(OCHMeCH$_2$OMe)$_2$] in a 1000-mL round-bottomed flask and dissolving them in 200 mL of toluene added thereto with stirring.

Separately, 1.52 g (0.005 mol) of palladium acetylacetonate [Pd(CH$_3$COCHCOCH$_3$)$_2$] was dissolved in 100 mL of toluene to obtain an organometal salt solution, and the organometal salt solution was further added to the alkoxide mixed solution in the round-bottomed flask to obtain a homogenous mixed solution containing LaFeMnPd.

Subsequently, a blackish brown powder was obtained by the procedure of Example 1.

The X-ray powder diffraction analysis of the powder revealed that it was identified as a single crystal phase comprising a composite oxide having a perovskite structure of $La_{1.00}FE_{0.57}Mn_{0.38}Pd_{0.05}O_3$. The powder was found to have a specific surface area of 36 m$^2$/g, and, in the composite oxide, a Pd content of 2.17% by mass.

Example 3

Initially, an alkoxide mixed solution was prepared by charging 32.5 g (0.080 mol) of lanthanum ethoxyethylate [La(OC$_2$H$_4$OEt)$_3$], 8.2 g (0.020 mol) of neodymium ethoxyethylate [Nd(OC$_2$H$_4$OEt)$_3$], and 29.1 g (0.090 mol) of iron ethoxyethylate [Fe(OC$_2$H$_4$OEt)$_3$] in a 1000-mL round-bottomed flask and dissolving them in 200 mL of xylene added thereto with stirring.

Separately, 3.05 g (0.010 mol) of palladium cetylacetonate [Pd(CH$_3$COCHCOCH$_3$)$_2$] was dissolved in 200 mL of xylene to obtain an organometal salt solution, and the organometal salt solution was further added to the alkoxide mixed solution in the round-bottomed flask to obtain a homogenous mixed solution containing LaNdFePd.

Subsequently, a blackish brown powder was obtained by the procedure of Example 1.

The X-ray powder diffraction analysis of the powder revealed that it was identified as a single crystal phase comprising a composite oxide having a perovskite structure of $La_{0.80}Nd_{0.90}Fe_{0.90}Pd_{0.10}O_3$. The powder was found to have a specific surface area of 28 m$^2$/g, and, in the composite oxide, a Pd content of 4.28% by mass.

Example 4

Initially, an alkoxide mixed solution was prepared by charging 25.5 g (0.070 mol) of lanthanum methoxyethylate [La(OC$_2$H$_4$OMe)$_3$], 7.3 g (0.020 mol) of praseodymium methoxyethylate [Pr(OC$_2$H$_4$OMe)$_3$], 1.9 g (0.010 mol) of calcium methoxyethylate [Ca(OC$_2$H$_4$OMe)$_2$], 19.7 g (0.070 mol) of iron methoxyethylate [Fe(OC$_2$H$_4$OMe)$_3$], and 5.1 g (0.025 mol) of manganese methoxyethylate [Mn(OC$_2$H$_4$OMe)$_2$] in a 1000-mL round-bottomed flask and dissolving them in 200 mL of benzene added thereto with stirring.

Separately, 1.52 g (0.005 mol) of palladium acetylacetonate [Pd(CH$_3$COCHCOCH$_3$)$_2$] was dissolved in 200 mL of benzene to obtain an organometal salt solution, and the organometal salt solution was further added to the alkoxide mixed solution in the round-bottomed flask to obtain a homogenous mixed solution containing LaPrCaFeMnPd.

Subsequently, a blackish brown powder was obtained by the procedure of Example 1.

The X-ray powder diffraction analysis of the powder revealed that it was identified as a single crystal phase comprising a composite oxide having a perovskite structure of $La_{0.70}Pr_{0.20}Ca_{0.10}Fe_{0.70}Mn_{0.25}Pd_{0.05}O_3$. The powder was found to have a specific surface area of 30 m$^2$/g, and, in the composite oxide, a Pd content of 2.26% by mass.

Example 5

Initially, an alkoxide mixed solution was prepared by charging 43.6 g (0.100 mol) of lanthanum methoxypropylate [La(OCHMeCH$_2$OMe)$_3$] and 33.5 g (0.095 mol) of iron methoxypropylate [Fe(OCHMeCH$_2$OMe)$_3$] in a 1000-mL round-bottomed flask and dissolving them in 200 mL of toluene added thereto with stirring.

Separately, 1.52 g (0.005 mol) of palladium acetylacetonate [Pd(CH$_3$COCHCOCH$_3$)$_2$] was dissolved in 200 mL of toluene to obtain an organometal salt solution, and the organometal salt solution was further added to the alkoxide mixed solution in the round-bottomed flask to obtain a homogenous mixed solution containing LaFePd.

Subsequently, a blackish brown powder was obtained by the procedure of Example 1.

The X-ray powder diffraction analysis of the powder revealed that it was identified as a single crystal phase comprising a composite oxide having a perovskite structure of $La_{1.00}Fe_{0.95}Pd_{0.05}O_3$. The powder was found to have a specific surface area of 28 m$^2$/g, and, in the composite oxide, a Pd content of 2.17% by mass.

Example 6

Initially, an alkoxide mixed solution was prepared by charging 32.5 g (0.080 mol) of lanthanum methoxypropylate [La(OCHMeCH$_2$OMe)$_3$], 6.2 g (0.015 mol) of neodymium methoxypropylate [Nd(OCHMeCH$_2$OMe)$_3$], 2.0 g (0.005 mol) of cerium methoxypropylate [Ce(OCHMeCH$_2$OMe)$_3$], 24.2 g (0.075 mol) of iron methoxypropylate [Fe(OCHMeCH$_2$OMe)$_3$], and 4.7 g (0.020 mol) of nickel methoxypropylate [Ni(OCHMeCH$_2$OMe)$_2$] in a 1000-mL round-bottomed flask and dissolving them in 200 mL of toluene added thereto with stirring.

Separately, 2.00 g (0.005 mol) of rhodium acetylacetonate [Rh(CH$_3$COCHCOCH$_3$)$_3$] was dissolved in 200 mL of toluene to obtain an organometal salt solution, and the organometal salt solution was further added to the alkoxide mixed solution in the round-bottomed flask to obtain a homogenous mixed solution containing LaNdCeFeNiRh.

Subsequently, a blackish brown powder was obtained by the procedure of Example 1.

The X-ray powder diffraction analysis of the powder revealed that it was identified as a single crystal phase comprising a composite oxide having a perovskite structure of $La_{0.80}Nd_{0.15}Ce_{0.05}Fe_{0.75}Ni_{0.20}Rh_{0.05}O_3$. The powder was found to have a specific surface area of 32 m$^2$/g, and, in the composite oxide, a Rh content of 2.09% by mass.

Example 7

Initially, an alkoxide mixed solution was prepared by charging 31.6 g (0.100 mol) of lanthanum i-propoxide [La(O$^{i-}$C$_3$H$_7$)$_3$] and 19.4 g (0.095 mol) of aluminum i-propoxide [Al(O$^{i-}$C$_3$H$_7$)$_3$] in a 1000-mL round-bottomed flask and dissolving them in 200 mL of benzene added thereto with stirring.

Separately, 2.00 g (0.005 mol) of rhodium acetylacetonate [Rh(CH$_3$COCHCOCH$_3$)$_3$] was dissolved in 200 mL of benzene to obtain an organometal salt solution, and the organometal salt solution was further added to the alkoxide mixed solution in the round-bottomed flask to obtain a homogenous mixed solution containing LaAlRh.

Subsequently, a blackish brown powder was obtained by the procedure of Example 1, except for carrying out the heat treatment at 800° C. for two hours.

The X-ray powder diffraction analysis of the powder revealed that it was identified as a single crystal phase comprising a composite oxide having a perovskite structure of $La_{1.00}Al_{0.95}Rh_{0.05}O_3$. The powder was found to have a specific surface area of 24 m$^2$/g, and, in the composite oxide, a Rh content of 2.34% by mass.

Next, the powder was impregnated with 25.9 g (corresponding to 0.22 g of Pt) of a dinitrodiammine platinum nitrate solution having a Pt content of 8.50% by mass, subjected to forced-air drying at 60° C. for twenty-four hours, subjected to heat treatment at 500° C. in the atmosphere for one hour using an electric furnace to obtain a Pt-supporting/$La_{1.00}Al_{0.95}Rh_{0.05}O_3$ powder. The amount of Pt supported was 1.00% by mass.

Example 8

Initially, an alkoxide mixed solution was prepared by charging 32.2 g (0.090 mol) of lanthanum n-butoxide [La(O$^{n-}$C$_4$H$_9$)$_3$], 3.1 g (0.010 mol) of yttrium n-butoxide [Y(O$^{n-}$C$_4$H$_9$)$_3$], 19.3 g (0.070 mol) of iron n-butoxide [Fe(O$^{n-}$C$_4$H$_9$)$_3$], and 4.9 g (0.020 mol) of aluminum n-butoxide [Al(O$^{n-}$C$_4$H$_9$)$_3$] in a 1000-mL round-bottomed flask and dissolving them in 200 mL of toluene added thereto with stirring.

Separately, 4.00 g (0.01 mol) of rhodium acetylacetonate [Rh(CH$_3$COCHCOCH$_3$)$_3$] was dissolved in 200 mL of toluene to obtain an organometal salt solution, and the organometal salt solution was further added to the alkoxide mixed solution in the round-bottomed flask to obtain a homogenous mixed solution containing LaYFeAlRh.

Subsequently, a blackish brown powder was obtained by the procedure of Example 1, except for carrying out the heat treatment at 800° C. for two hours.

The X-ray powder diffraction analysis of the powder revealed that it was identified as a single crystal phase comprising a composite oxide having a perovskite structure of $La_{0.90}Y_{0.10}Fe_{0.70}Al_{0.20}Rh_{0.10}O_3$. The powder was found to have a specific surface area of 21 m$^2$/g, and, in the composite oxide, a Rh content of 4.35% by mass.

Example 9

Initially, an alkoxide mixed solution was prepared by charging 37.0 g (0.090 mol) of neodymium ethoxyethylate [Nd(OC$_2$H$_4$OEt)$_3$], 3.2 g (0.010 mol) of barium ethoxyethylate [Ba(OC$_2$H$_4$OEt)$_2$], 25.8 g (0.080 mol) of iron ethoxyethylate [Fe(OC$_2$H$_4$OEt)$_3$], and 2.4 g (0.010 mol) of copper ethoxyethylate [Cu(OC$_2$H$_4$OEt)$_2$] in a 1000-mL round-bottomed flask and dissolving them in 200 mL of xylene added thereto with stirring.

Separately, 4.90 g (0.010 mol) of iridium acetylacetonate [Ir(CH$_3$COCHCOCH$_3$)$_3$] was dissolved in 200 mL of xylene to obtain an organometal salt solution, and the organometal salt solution was further added to the alkoxide mixed solution in the round-bottomed flask to obtain a homogenous mixed solution containing NdBaFeCuIr.

Subsequently, a blackish brown powder was obtained by the procedure of Example 1, except for carrying out the heat treatment at 800° C. for two hours.

The X-ray powder diffraction analysis of the powder revealed that it was identified as a single crystal phase comprising a composite oxide having a perovskite structure of $Nd_{0.90}Ba_{0.10}Fe_{0.80}Cu_{0.10}Ir_{0.10}O_3$. The powder was found to have a specific surface area of 18 m$^2$/g, and, in the composite oxide, an Ir content of 7.34% by mass.

Example 10

Initially, an alkoxide mixed solution was prepared by charging 36.6 g (0.090 mol) of lanthanum ethoxyethylate [La(OC$_2$H$_4$OEt)$_3$], 2.7 g (0.010 mol) of strontium ethoxyethylate [Sr(OC$_2$H$_4$OEt)$_2$], 17.4 g (0.054 mol) of iron ethoxyethylate [Fe(OC$_2$H$_4$OEt)$_3$], and 8.5 g (0.036 mol) of cobalt ethoxyethylate [Co(OC$_2$H$_4$OEt)$_2$] in a 1000-mL round-bottomed flask and dissolving them in 200 mL of toluene added thereto with stirring.

Separately, 3.93 g (0.010 mol) of platinum acetylacetonate [Pt(CH$_3$COCHCOCH$_3$)$_2$] was dissolved in 200 mL of toluene to obtain an organometal salt solution, and the organometal salt solution was further added to the alkoxide mixed solution in the round-bottomed flask to obtain a homogenous mixed solution containing LaSrFeCoPt.

Subsequently, a blackish brown powder was obtained by the procedure of Example 1.

The X-ray powder diffraction analysis of the powder revealed that it was identified as a single crystal phase comprising a composite oxide having a perovskite structure of $La_{0.90}Sr_{0.10}Fe_{0.54}Co_{0.36}Pt_{0.10}O_3$. The powder was found to have a specific surface area of 28 m$^2$/g, and, in the composite oxide, a Pt content of 7.72% by mass.

Example 11

Initially, an alkoxide mixed solution was prepared by charging 34.6 g (0.095 mol) of lanthanum methoxyethylate $[La(OC_2H_4OMe)_3]$, 20.2 g (0.080 mol) of aluminum methoxyethylate $[Al(OC_2H_4OMe)_3]$, and 2.0 g (0.010 mol) of manganese methoxyethylate $[Mn(OC_2H_4OMe)_2]$ in a 1000-mL round-bottomed flask and dissolving them in 200 mL of toluene added thereto with stirring.

Separately, 1.04 g (0.005 mol) of silver acetylacetonate $[Ag(CH_3COCHCOCH_3)]$, 3.14 g (0.008 mol) of platinum acetylacetonate $[Pt(CH_3COCHCOCH_3)_2]$, and 0.80 g (0.002 mol) of ruthenium acetylacetonate $[Ru(CH_3COCHCOCH_3)_3]$ were dissolved in 200 mL of toluene to obtain an organometal salt solution, and the organometal salt solution was further added to the alkoxide mixed solution in the round-bottomed flask to obtain a homogenous mixed solution containing LaAgAlMnPtRu.

Subsequently, a blackish brown powder was obtained by the procedure of Example 1, except for carrying out the heat treatment at 800° C. for two hours.

The X-ray powder diffraction analysis of the powder revealed that it was identified as a single crystal phase comprising a composite oxide having a perovskite structure of $La_{0.95}Ag_{0.05}Al_{0.80}Mn_{0.10}Pt_{0.08}Ru_{0.02}O_3$. The powder was found to have a specific surface area of 19 m$^2$/g, and, in the composite oxide, a Ag content of 2.42% by mass, a Pt content of 6.78% by mass, and a Ru content of 0.88% by mass.

Example 12

Initially, an alkoxide mixed solution was prepared by charging 32.9 g (0.080 mol) of neodymium methoxypropylate $[Nd(OCHMeCH_2OMe)_3]$, 3.2 g (0.010 mol) of barium methoxypropylate $[Ba(OCHMeCH_2OMe)_2]$, 2.0 g (0.010 mol) of magnesium methoxypropylate $[Mg(OCHMeCH_2OMe)_2]$, and 25.0 g (0.085 mol) of aluminum methoxypropylate $[Al(OCHMeCH_2OMe)_3]$ in a 1000-mL round-bottomed flask and dissolving them in 200 mL of xylene added thereto with stirring.

Separately, 3.93 g (0.010 mol) of platinum acetylacetonate $[Pt(CH_3COCHCOCH_3)_2]$ and 2.00 g (0.005 mol) of rhodium acetylacetonate $[Rh(CH_3COCHCOCH_3)_3]$ were dissolved in 200 mL of xylene to obtain an organometal salt solution, and the organometal salt solution was further added to the alkoxide mixed solution in the round-bottomed flask to obtain a homogenous mixed solution containing NdBaMgAlPtRh.

Subsequently, a blackish brown powder was obtained by the procedure of Example 1.

The X-ray powder diffraction analysis of the powder revealed that it was identified as a single crystal phase comprising a composite oxide having a perovskite structure of $Nd_{0.80}Ba_{0.10}Mg_{0.10}Al_{0.85}Pt_{0.10}Rh_{0.05}O_3$. The powder was found to have a specific surface area of 29 m$^2$/g, and, in the composite oxide, a Pt content of 8.59% by mass and a Rh content of 2.27% by mass.

Example 13

Initially, an organometal salt solution was prepared by charging 43.6 g (0.100 mol) of lanthanum acetylacetonate $[La(CH_3COCHCOCH_3)_3]$, 21.2 g (0.060 mol) of iron acetylacetonate $[Fe(CH_3COCHCOCH_3)_3]$, and 12.2 g (0.040 mol) of palladium acetylacetonate $[Pd(CH_3COCHCOCH_3)_2]$ in a 1000-mL round-bottomed flask and dissolving them in 300 mL of toluene added thereto with stirring.

Next, toluene was distilled off under reduced pressure to obtain a mixture. The mixture was thermally decomposed by heating to 400° C. in the atmosphere using an electric furnace to obtain a precursor of a LaFePd composite oxide. Then, the precursor was subjected to the heat treatment at 700° C. in the atmosphere for two hours using an electric furnace to obtain a blackish brown powder.

The X-ray powder diffraction analysis of the powder revealed that it was identified as a single crystal phase comprising a composite oxide having a perovskite structure of $La_{1.00}Fe_{0.60}Pd_{0.40}O_3$. The powder was found to have a specific surface area of 24 m$^2$/g, and, in the composite oxide, a Pd content of 16.2% by mass.

Example 14

Initially, an aqueous mixed salt solution was prepared by charging 43.3 g (0.100 mol) of lanthanum nitrate hexahydrate $(La(NO_3)_3 \cdot 6H_2O)$ and 36.4 g (0.090 mol) of iron nitrate enneahydrate $(Fe(NO_3)_3 \cdot 9H_2O)$ in a 1000-mL round-bottomed flask and dissolving and homogeneously mixing in 100 mL of deionized water. Next, 47.9 g (0.23 mol) of citric acid was dissolved in 100 mL of deionized water, and the resulting solution was added to the aqueous mixed salt solution to obtain an aqueous solution of citric acid and salts containing LaFe.

The aqueous solution of citric acid and salts was evaporated to dryness on a hot water bath at 60° C. to 80° C. with evacuation using a rotary evaporator. After passage of about three hours and when the solution came into a starch-syrup-like state, the temperature of the hot water bath was gradually raised, followed by drying at 300° C. in vacuum for one hour to obtain a citrate complex.

The above-prepared citrate complex was pulverized in a mortar and baked at 350° C. in the atmosphere for three hours and then charged again in the 1000-mL flask.

Then, 3.05 g (0.010 mol) of palladium acetylacetonate $[Pd(CH_3COCHCOCH_3)_2]$ was dissolved in 200 mL of acetone, and the resulting solution was charged in the round-bottomed flask, followed by stirring to obtain a homogeneous slurry containing LaFePd.

Acetone in the homogenous slurry was evaporated to dryness and the resulting powder was subjected to the heat treatment at 700° C. in the atmosphere for three hours using an electric furnace to obtain a blackish brown powder.

The X-ray powder diffraction analysis of the powder revealed that it was identified as a single crystal phase comprising a composite oxide having a perovskite structure of $La_{1.00}Fe_{0.90}Pd_{0.10}O_3$. The powder was found to have a specific surface area of 28 m$^2$/g and a Pd content in the composite oxide of 4.31% by mass.

Example 15

Initially, an aqueous mixed salt solution was prepared by charging 37.1 g (0.100 mol) of lanthanum chloride heptahydrate [$LaCl_3 \cdot 7H_2O$] and 21.6 g (0.080 mol) of iron chloride hexahydrate [$FeCl_3 \cdot 6H_2O$] in a 1000-mL round-bottomed flask and dissolving and homogeneously mixing in 200 mL of deionized water. Next, the aqueous mixed salt solution was gradually added dropwise in an aqueous alkali solution prepared by 208 g of ammonium carbonate having a $NH_3$ content of 30% by weight in 200 mL of deionized water to obtain a coprecipitate. After stirring at room temperature for two hours, the resulting coprecipitate was sufficiently washed with water and then filtered.

The coprecipitate was placed on a petri dish and sufficiently dried by forced-air drying at 80° C. for twelve hours, pulverized in a mortar and then charged again in the 1000-mL flask.

Then, 6.09 g (0.020 mol) of palladium acetylacetonate [$Pd(CH_3COCHCOCH_3)_2$] was dissolved in 400 mL of acetone, and the resulting solution was charged in the round-bottomed flask, followed by stirring to obtain a homogeneous slurry containing LaFePd.

Acetone in the homogenous slurry was evaporated to dryness and the resulting powder was subjected to the heat treatment at 700° C. in the atmosphere for three hours using an electric furnace to obtain a blackish brown powder.

The X-ray powder diffraction analysis of the powder revealed that it was identified as a single crystal phase comprising a composite oxide having a perovskite structure of $La_{1.00}Fe_{0.80}Pd_{0.20}O_3$. The powder was found to have a specific surface area of 32 $m^2/g$ and a Pd content in the composite oxide of 8.31% by mass.

Comparative Example 1

Initially, an alkoxide mixed solution was prepared by charging 36.6 g (0.090 mol) of lanthanum methoxypropylate [$La(OCHMeCH_2OMe)_3$], 4.1 g (0.010 mol) of cerium methoxypropylate [$Ce(OCHMeCH_2OMe)_3$], 18.4 g (0.057 mol) of iron methoxypropylate [$Fe(OCHMeCH_2OMe)_3$], and 9.0 g (0.038 mol) of cobalt methoxypropylate [$Co(OCHMeCH_2OMe)_2$] in a 1000-mL round-bottomed flask and dissolving them in 200 mL of toluene added thereto with stirring.

Next, an aqueous solution prepared by diluting 12.0 g (corresponding to 0.53 g (0.005 mol) of Pd) of an aqueous palladium nitrate solution having a Pd content of 4.4% by mass with 100 mL of deionized water was added dropwise to the round-bottomed flask over about fifteen minutes to form a viscous brown precipitate on hydrolysis.

Subsequently, a blackish brown powder was obtained by the procedure of Example 1, except for carrying out the heat treatment at 850° C. for two hours.

The X-ray powder diffraction analysis of the powder revealed that it was identified as a single crystal phase comprising a composite oxide having a perovskite structure of $La_{0.90}Ce_{0.10}Fe_{0.57}Co_{0.38}Pd_{0.05}O_3$. The powder was found to have a specific surface area of 30 $m^2/g$, and, in the composite oxide, a Pd content of 2.16% by mass.

Comparative Example 2

A total of 100 g of a commercially available $\gamma$-$Al_2O_3$ having a specific surface area of 180 $m^2/g$ was impregnated with Pd using 50.2 g (corresponding to 2.21 g of Pd) of aqueous palladium nitrate solution having a Pd content of 4.4% by mass, subjected to forced-air drying at 60° C. for twenty-four hours and then subjected to the heat treatment at 500° C. in the atmosphere for one hour using an electric furnace. The amount of Pd supported by $\gamma$-$Al_2O_3$ was 2.16% by mass.

Comparative Example 3

A total of 20 g of a commercially available $\gamma$-$Al_2O_3$ having a specific surface area of 180 $m^2/g$ was impregnated with Rh using 9.6 g (corresponding to 0.43 g of Rh) of an aqueous rhodium nitrate solution having a Rh content of 4.48% by mass, subjected to forced-air drying at 60° C. for twenty-four hours and then subjected to the heat treatment at 500° C. in the atmosphere for one hour using an electric furnace. The amount of Rh supported by $\gamma$-$Al_2O_3$ was 2.10% by mass.

Comparative Example 4

A total of 20 g of a commercially available $\gamma$-$Al_2O_3$ having a specific surface area of 180 $m^2/g$ was impregnated with Pd using 10.5 g (corresponding to 1.03 g of Pd) of an aqueous palladium nitrate solution having a Pd content of 9.83% by mass, subjected to forced-air drying at 60° C. for twenty-four hours and then subjected to the heat treatment at 500° C. in the atmosphere for one hour using an electric furnace. The amount of Pd supported by $\gamma$-$Al_2O_3$ was 4.90% by mass.

Comparative Example 5

A total of 20 g of a commercially available $\gamma$-$Al_2O_3$ having a specific surface area of 180 $m^2/g$ was impregnated with Pt using 27.1 g (corresponding to 2.3 g of Pt) of a dinitrodiammine platinum nitrate solution having a Pt content of 8.50% by mass, subjected to forced-air drying at 60° C. for twenty-four hours and then subjected to heat treatment at 500° C. in the atmosphere for one hour using an electric furnace. The amount of Pt supported by $\gamma$-$Al_2O_3$ was 10.3% by mass.

Test Example 1

1) Coating to Catalyst Carrier

A total of 100 mL of deionized water was mixed with 100 g of the powders prepared according to Example 1 and Comparative Examples 1 and 2, followed by addition of 17.5 g of zirconia sol (NZS-30B, a product of Nissan Chemical Industries, Ltd.; a solid content of 30% by mass) to obtain a slurry. The slurry was applied by coating to a catalyst carrier comprising a cordierite honeycomb having a diameter of 80 mm, a length of 95 mm, and a grating density of 400 cells/$(0.025\ m)^2$.

After coating, excess slurry was removed by air blow so as to set the coating amount of the powder at 157.5 g per 1 L of the catalyst carrier (75.1 g per one catalyst carrier). After forced-air drying at 120° C. for twelve hours, the work was baked at 600° C. in the atmosphere for three hours to obtain monolith catalysts containing the powders according to Example 1 and Comparative Examples 1 and 2, respectively.

2) Endurance Test

The above-prepared monolith catalysts were connected to both banks of a V type eight cylinder engine having a displacement of 4 liters and were subjected to an endurance test at a highest temperature in the catalyst bed of 1050° C. with a single cycle of 30 seconds repeated for a total of 40 hours.

One cycle of the endurance test was set as follows. Specifically, from Second 0 to Second 5 (a period of 5 seconds), the operation was carried out at a theoretical fuel-air ratio ($\lambda=1$). From Second 5 to Second 28 (a period of 23 seconds), an excessive amount of fuel was fed to the bed ($\lambda=0.89$). From Second 7 to Second 30 (a period of 23 seconds) lagging two seconds from the above, high-pressure secondary air was introduced upstream of the catalysts. From Second 7 to Second 28 (a period of 21 seconds), a slightly excessive amount of air was fed ($\lambda=1.02$) to cause the excessive fuel to burn in the interior of the bed, so as to raise the temperature of the catalyst bed to 1050° C. From Second 28 to Second 30 (a period of 2 seconds), the interior of the bed was returned to the theoretical fuel-air ratio ($\lambda=1$) and the secondary air was kept to be fed to achieve a high-temperature oxidative atmosphere in which the air is in large excess ($\lambda=1.25$).

3) Activity Measurement

Using an in-line four-cylinder engine having a displacement of 1.5 liters, an oscillation (amplitude) of $\Delta\lambda=\pm3.4\%$ ($\Delta A/F=\pm0.5$ A/F) of which the center was set in the theoretical fuel-air ratio ($\lambda=1$) was applied to the monolith catalysts at a frequency of 1 Hz. The purification rates of CO, HC, and NOx of the monolith catalysts before and after this endurance test were measured. The results are shown in Table 1. In the measurement, the temperature of the upstream (inlet gas) of the monolith catalysts was kept at 460° C. and the flow rate was set at a space velocity (SV) of 50000 per hour. Table 1 also shows the Pd content (g) per 1 liter of each of the monolith catalysts.

Test Example 2

1) Coating to Catalyst Carrier

A total of 120 mL of deionized water was mixed with 20 g of the powders prepared according to Examples 2, 4, 6, and 7 and Comparative Examples 2 and 3 and 100 g of a powdery composite oxide having a composition of $Ce_{0.6}Zr_{0.3}Y_{0.1}O_{0.95}$, followed by addition of 21.1 g of zirconia sol (NZS-30B, a product of Nissan Chemical Industries, Ltd.; a solid content of 30% by mass) to obtain a slurry. The slurry was applied by coating to a catalyst carrier comprising a cordierite honeycomb having a diameter of 80 mm, a length of 95 mm, and a grating density of 400 cells/$(0.025\ m)^2$.

After coating, excess slurry was removed by air blow so as to set the coating amount of the powder at 126 g per 1 L of the catalyst carrier (60 g per one catalyst carrier). After forced-air drying at 120° C. for twelve hours, the work was baked at 600° C. in the atmosphere for three hours to obtain monolith catalysts containing the powders according to Examples 2, 4, 6, and 7 and Comparative Examples 2 and 3, respectively.

2) Endurance Test

The above-prepared monolith catalysts were connected to both banks of a V type eight cylinder engine having a displacement of 4 liters and were subjected to an endurance test at a temperature in the catalyst bed of 900° C. with a single cycle of 900 seconds repeated for a total of 100 hours.

One cycle of the endurance test was set as follows. Specifically, from Second 0 to Second 870 (a period of 870 seconds), an oscillation (amplitude) of $\Delta\lambda=\pm4\%$ ($\Delta A/F=\pm0.6$ A/F) with the theoretical fuel-air ratio ($\lambda=1$) of A/F=14.6 (A/F=air to fuel ratio) at the center was applied to the monolith catalysts at a frequency of 0.6 Hz. From Second 870 to Second 900 (a period of 30 seconds), secondary air was introduced upstream of the catalysts to achieve forced oxidation under the conditions ($\lambda=1.25$).

3) Activity Measurement

Under the same conditions as in the item 3) (activity measurement) of Test Example 1, the purification rates of CO, HC, and NOx of the monolith catalysts before and after this endurance test were determined. The results are shown in Table 2. In the measurement, the flow rate was set at a space velocity (SV) of 70000 per hour. Table 2 also shows the noble metal content (g) per 1 liter of each of the monolith catalysts.

TABLE 1

| Catalyst | Composition | Pd content (g/L catalyst) | Purification rate before endurance test (%) | | | Purification rate after endurance test (%) | | |
|---|---|---|---|---|---|---|---|---|
| | | | CO | HC | NOx | CO | HC | NOx |
| Example 1 | $La_{0.90}Ce_{0.10}Fe_{0.57}Co_{0.38}Pd_{0.05}O_3$ | 3.24 | 98.1 | 97.8 | 99.7 | 90.6 | 89.0 | 91.5 |
| Comparative Example 1 | $La_{0.90}Ce_{0.10}Fe_{0.57}Co_{0.38}Pd_{0.05}O_3$ | 3.24 | 98.5 | 97.6 | 99.8 | 84.9 | 82.1 | 84.1 |
| Comparative Example 2 | Pd-supporting/$\gamma$-$Al_2O_3$ | 3.24 | 97.5 | 99.3 | 99.3 | 48.3 | 75.1 | 78.2 |

Table 1 shows that the monolith catalyst comprising the powder according to Comparative Example 2 exhibits markedly decreased purification rates after the endurance test, and that, in contrast, the monolith catalyst comprising the powder according to Example 1 maintains their high activities even after the endurance test.

Table 1 also shows that, although the catalysts according to Example 1 and Comparative Example 1 have the same composition, the monolith catalyst comprising the powder according to Example 1 produced by the method of the present invention causes less deterioration after the endurance test as compared with the monolith catalyst comprising the powder according to Comparative Example 1.

TABLE 2

| Catalyst | Composition | Noble metal content (g/L catalyst) | Purification rate before endurance test (%) | | | Purification rate after endurance test (%) | | |
|---|---|---|---|---|---|---|---|---|
| | | | CO | HC | NOx | CO | HC | NOx |
| Example 2 | $La_{1.00}Fe_{0.57}Mn_{0.38}Pd_{0.05}O_3$ | Pd: 0.43 | 96.7 | 98.4 | 96.1 | 87.1 | 89.6 | 87.4 |
| Example 4 | $La_{0.70}Pr_{0.20}Ca_{0.10}Fe_{0.70}Mn_{0.25}Pd_{0.05}O_3$ | Pd: 0.45 | 95.4 | 95.6 | 94.3 | 86.7 | 87.5 | 86.3 |
| Example 6 | $La_{0.80}Nd_{0.15}Ce_{0.05}Fe_{0.75}Ni_{0.20}Rh_{0.05}O_3$ | Rh: 0.42 | 94.4 | 94.9 | 98.5 | 85.0 | 86.2 | 88.4 |
| Example 7 | Pt-supporting/$La_{1.00}Al_{0.95}Rh_{0.05}O_3$ | Rh: 0.47 Pt: 0.20 | 97.3 | 98.0 | 99.0 | 88.2 | 89.3 | 90.8 |
| Comparative Example 2 | Pd-supporting/$\gamma$-$Al_2O_3$ | Pd: 0.43 | 97.7 | 100 | 98.8 | 52.3 | 73.8 | 67.5 |
| Comparative Example 3 | Rh-supporting/$\gamma$-$Al_2O_3$ | Rh: 0.42 | 98.0 | 98.7 | 99.8 | 79.2 | 72.1 | 83.1 |

Table 2 shows that the monolith catalysts comprising the powders according to Comparative Examples 2 and 3 exhibit markedly decreased purification rates after the endurance test, and that, in contrast, the monolith catalysts comprising the powders according to Example 2, 4, 6, and 7 maintain their high activities even after the endurance test.

Test Example 3

1) Coating to Catalyst Carrier

Using the powders obtained in Examples 3, 5, and 8 to 15 and Comparative Examples 4 and 5, monolith catalysts containing the powders according to Examples 3, 5, and 8 to 15 and Comparative Examples 4 and 5 were obtained, respectively, by the same procedure as in the item 1) (coating to the catalyst carrier) of Test Example 2.

2) Endurance Test

Under the same conditions as in the item 2) (endurance test) of Test Example 1, the above-prepared monolith catalysts were connected to both banks of a V type eight cylinder engine having a displacement of 4 liters and were subjected to an endurance test at a highest temperature in the catalyst bed of 1050° C. with a single cycle of 30 seconds repeated for a total of 60 hours.

3) Activity Measurement

Under the same conditions for activity measurement as in the item 3) of Test Example 1, the purification rates of CO, HC, and NOx of the monolith catalysts before and after this endurance test were measured. The results are shown in Table 3. Table 3 also shows the noble metal content (g) per 1 liter of each of the monolith catalysts.

TABLE 3

| Catalyst | Composition | Noble metal content (g/L catalyst) | Purification rate before endurance test (%) | | | Purification rate after endurance test (%) | | |
|---|---|---|---|---|---|---|---|---|
| | | | CO | HC | NOx | CO | HC | NOx |
| Example 3 | $La_{0.80}Nd_{0.20}Fe_{0.90}Pd_{0.10}O_3$ | Pd: 0.86 | 98.2 | 99.8 | 97.8 | 87.4 | 89.1 | 88.5 |
| Example 5 | $La_{1.00}Fe_{0.95}Pd_{0.05}O_3$ | Pd: 0.43 | 98.1 | 99.7 | 97.0 | 85.3 | 88.9 | 87.2 |
| Example 8 | $La_{0.90}Y_{0.10}Fe_{0.70}Al_{0.20}Rh_{0.10}O_3$ | Rh: 0.87 | 95.5 | 97.6 | 99.0 | 86.8 | 86.1 | 92.5 |
| Example 9 | $Nd_{0.90}Ba_{0.10}Fe_{0.80}Cu_{0.10}Ir_{0.10}O_3$ | Ir: 1.47 | 92.1 | 93.5 | 98.5 | 77.0 | 86.0 | 86.0 |
| Example 10 | $La_{0.90}Sr_{0.10}Fe_{0.54}Co_{0.36}Pt_{0.10}O_3$ | Pt: 1.54 | 94.3 | 96.8 | 93.8 | 85.7 | 88.5 | 85.1 |
| Example 11 | $La_{0.95}Ag_{0.05}Al_{0.80}Mn_{0.10}Pt_{0.08}Ru_{0.02}O_3$ | Ag: 0.48 Pt: 1.36 Ru: 0.18 | 96.6 | 93.4 | 97.2 | 87.6 | 82.0 | 81.7 |
| Example 12 | $Nd_{0.80}Ba_{0.10}Mg_{0.10}Al_{0.85}Pt_{0.10}Rh_{0.05}O_3$ | Pt: 1.72 Rh: 0.45 | 99.3 | 100 | 100 | 92.0 | 89.7 | 92.5 |
| Example 13 | $La_{1.00}Fe_{0.60}Pd_{0.40}O_3$ | Pd: 3.24 | 99.8 | 100 | 99.8 | 90.5 | 91.6 | 91.4 |
| Example 14 | $La_{1.00}Fe_{0.90}Pd_{0.10}O_3$ | Pd: 0.86 | 99.5 | 99.8 | 99.0 | 86.7 | 90.2 | 88.9 |
| Example 15 | $La_{1.00}Fe_{0.80}Pd_{0.20}O_3$ | Pd: 1.72 | 99.6 | 100 | 99.5 | 88.8 | 90.8 | 91.1 |
| Comparative Example 4 | Pd-supporting/$\gamma$-$Al_2O_3$ | Pd: 0.98 | 98.2 | 100 | 100 | 26.1 | 57.1 | 50.7 |
| Comparative Example 5 | Pt-supporting/$\gamma$-$Al_2O_3$ | Pt: 2.06 | 98.8 | 92.1 | 87.0 | 66.7 | 60.8 | 27.1 |

Table 3 shows that the monolith catalysts comprising the powders according to Comparative Examples 4 and 5 exhibit markedly decreased purification rates after the endurance test, and that, in contrast, the monolith catalysts comprising the powders according to Example 3, 5, and 8 to 15 maintain their high activities even after the endurance test.

While the illustrative embodiments and examples of the present invention are provided in the above description, such is for illustrative purpose only and it is not to be construed restrictively. Modification and variation of the present invention which will be obvious to those skilled in the art is to be covered in the following claims.

INDUSTRIAL APPLICABILITY

According to the method for producing a perovskite-type composite oxide of the present invention, there can be produced a perovskite-type composite oxide which can maintain the catalytic activity of a noble metal at a high level over a long time. Such a perovskite-type composite oxide is advantageously usable as an exhaust gas purifying catalyst, particularly as an automobile exhaust gas purifying catalyst.

The invention claimed is:

1. A method for producing a perovskite-type composite oxide, which comprises the steps of:
    preparing a precursor of the perovskite-type composite oxide by mixing an organometal, salt of a noble metal with another elementary component constituting the perovskite-type composite oxide, and
    heat-treating the precursor of the perovskite-type composite oxide;
    wherein the perovskite-type composite oxide is a perovskite-type composite oxide represented by the following general formula (1):

$$ABMO_3 \tag{1}$$

wherein A represents at least one element selected from the group consisting of rare-earth elements, alkaline earth metals, and Ag; B represents at least one element selected from the group consisting of Al and transition metals excluding platinum group elements and rare-earth elements; and M represents one or more platinum group elements.

2. The method for producing a perovskite-type composite oxide according to claim 1, wherein the other elementary components are prepared as alkoxides of the respective elements.

3. The method for producing a perovskite-type composite oxide according to claim 1, wherein the other elementary components are prepared as a coprecipitate of salts of the respective elements or a citrate complex of the respective elements.

4. The method for producing a perovskite-type composite oxide according to claim 1, wherein the part of the elementary components is one or more noble metals.

5. The method for producing a perovskite-type composite oxide according to claim 1, wherein the organometal salts of the elementary components are organic carboxylic acid salts of the elementary components and/or a metal complex of the elementary components including at least one selected from the group consisting of β-diketone compounds, β-ketoester compounds and β-dicarboxylic ester compounds.

6. The method of claim 1, wherein the perovskite-type composite oxide is a perovskite-type composite oxide represented by the following general formula (2):

$$A_{1-x}A'_xB_{1-y}B'_yO_3 \tag{2}$$

wherein A represents at least one element selected from the group consisting of Y, La and Nd; A' represents at least one element selected from the group consisting of Ce, Pr, Mg, Ca, Sr, Ba, and Ag; B represents at least one element selected from the group consisting of Cr, Mn, Fe, Co, Ni, Cu and Al; and B' represents at least one element selected from the group consisting of Ru, Rh, Pd, Ir, and Pt;

wherein x represents an atomic ratio satisfying the relation $0 \leq x \leq 0.5$ and y represents an atomic ratio satisfying the relation: $0 < y \leq 0.5$.

* * * * *